(12) United States Patent
Chen

(10) Patent No.: US 7,849,908 B2
(45) Date of Patent: Dec. 14, 2010

(54) METHOD FOR MANUFACTURING HOSE COUPLINGS

(76) Inventor: Tsan-Jee Chen, 6F, No. 16, Sec. 5, Nanking E. Road, Taipei (TW)

( * ) Notice: Subject to any disclaimer, the term of this patent is extended or adjusted under 35 U.S.C. 154(b) by 287 days.

(21) Appl. No.: 12/137,872

(22) Filed: Jun. 12, 2008

(65) Prior Publication Data

US 2009/0308561 A1     Dec. 17, 2009

(51) Int. Cl.
*B22D 17/00* (2006.01)
*B22D 27/04* (2006.01)
*B22D 33/04* (2006.01)

(52) U.S. Cl. .................. 164/113; 164/122; 164/137

(58) Field of Classification Search .................. 164/113, 164/122, 137, 339, 342
See application file for complete search history.

(56) References Cited

U.S. PATENT DOCUMENTS 5,603,552 A * 2/1997 Hanna et al. ................. 297/473

2006/0208487 A1 * 9/2006 Ambrosi ...................... 285/396
2006/0273587 A1 * 12/2006 Ambrosi ...................... 285/401

\* cited by examiner

*Primary Examiner*—Kevin P Kerns
(74) *Attorney, Agent, or Firm*—Schmeiser, Olsen & Watts LLP

(57) ABSTRACT

A method for manufacturing hose couplings is composed of three steps as follows. The first step involves jointing and fixing a top casting-cavity insert and a bottom casting-cavity insert within a mold base of a casting machine. The second step is injecting a high-temperature molten metal into both the casting-cavity inserts, so that the molten metal can fill up the casting-cavity inserts. The third step is cooling the casting-cavity inserts by using a cooling liquid, so that the cooled and solidified metal can be released from the casting-cavity inserts to form a hose coupling. By using the method, various types of top casting-cavity inserts and bottom casting-cavity inserts may be adapted as desired and, therefore, various types of hose couplings may be manufactured as desired.

12 Claims, 5 Drawing Sheets

METHOD FOR MANUFACTURING HOSE COUPLINGS

BACKGROUND OF THE INVENTION

1. Field of the Invention

The present invention relates to a method for manufacturing hose couplings and, particularly, to a method for manufacturing hose couplings that can manufacture various types of hose couplings by utilizing a characteristic capability of adapting two casting-cavity inserts as desired.

2. Description of the Prior Art

Conventional manufacture of hose couplings mainly uses casting molds for performing the process of casting. However, there is a large variety of conventional types of hose couplings; therefore, various molds must be made as desired. Moreover, if some other types of couplings are required later, an increasing number of molds will be needed. All these molds not only take up a lot of space, but they also require much capital expenditure to finance the development of all these molds. Thus, the more molds required, the higher the relative cost is. This is, indeed, a burden to the manufacturer.

Since the conventional method has such drawbacks as described above, it is hardly a good one. An improvement is required urgently.

In view of the above difficulties associated with the conventional manufacture of hose couplings, the present inventor, through a long-term study and practice, has set about the work of improvement and innovation that provides the present method for manufacturing hose couplings.

SUMMARY OF THE INVENTION

The primary aspect of the present invention is to provide a method for manufacturing hose couplings that can manufacture various types of hose couplings by adapting and replacing various top and bottom casting-cavity inserts as desired.

Another aspect of the present invention is to provide a method for manufacturing hose couplings by utilizing a characteristic capability of adapting two casting-cavity inserts as desired to decrease the number of molds required, so as to reduce the space needed to store the molds. The method is different from the conventional method, in which couplings are made with one mold for one type of coupling. As a result, with more molds being made, more space is used for storing the molds.

A method for manufacturing hose couplings to fulfill the aspects of the present invention comprises three steps. The first step involves jointing and fixing a top casting-cavity insert and a bottom casting-cavity insert within a mold base of a casting machine. The second step is injecting a high-temperature molten metal into both the casting-cavity inserts, so that the molten metal may flow to and fill up the cavities within the casting-cavity inserts. The third step is to cool the casting-cavity inserts by using a cooling liquid, so that the molten metal within the casting-cavity inserts may solidify to form a hose coupling after a cooling period. By using the method described above, various top casting-cavity inserts and bottom casting-cavity inserts may be adapted as desired and, therefore, various types of hose couplings may be manufactured by utilizing the characteristic capability of replacing two casting-cavity inserts as desired.

These features and advantages of the present invention will be fully understood and appreciated from the following detailed description of the accompanying Drawings.

DESCRIPTION OF THE PREFERRED EMBODIMENT

Figure 1A:
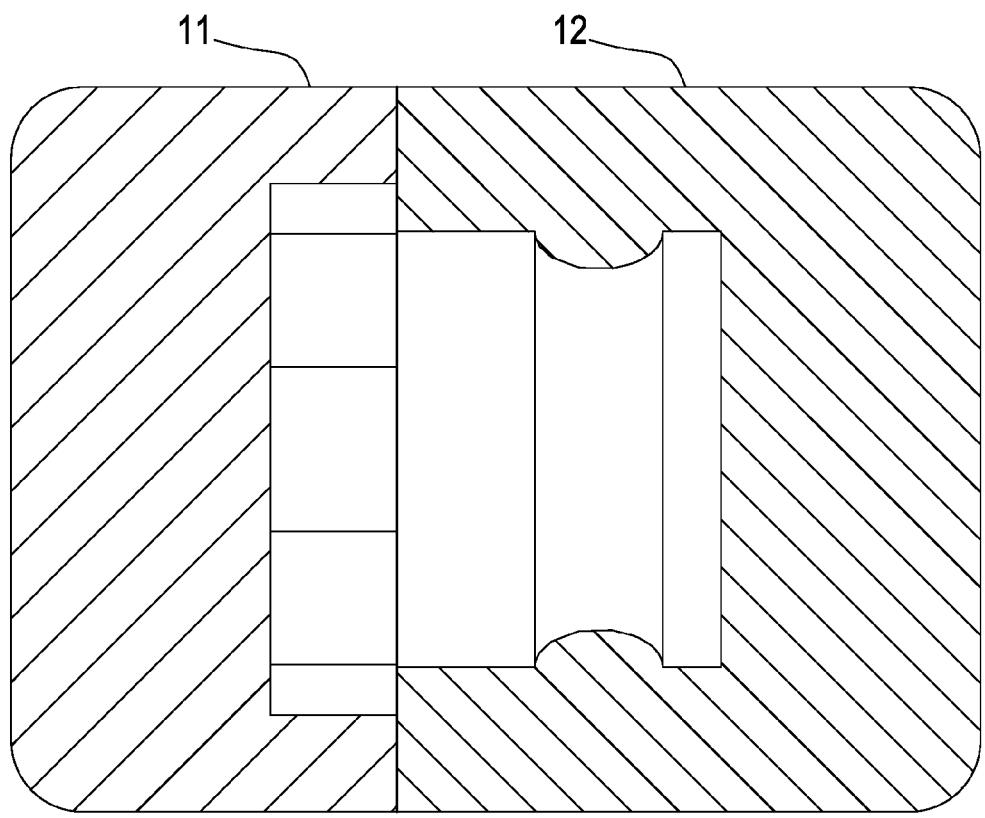
FIGS. 1A and 1B are, respectively, schematic diagrams for the flow of manufacture and the product in one embodiment of the present invention.
Figure 1B:
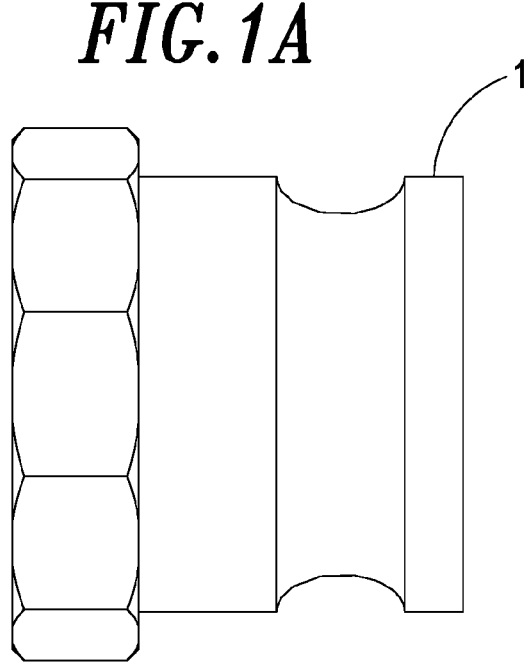

Referring to FIGS. 1A and 1B, which are, respectively, schematic diagrams for the flow of manufacture and the product in one embodiment of the method for manufacturing hose couplings according to the present invention, the method comprises the following steps: jointing and fixing a top casting-cavity insert 11 and a bottom casting-cavity insert 12 within a mold base of a casting machine; injecting a high-temperature molten metal from a furnace through an automatic machine or manually into both the casting-cavity inserts 11 and 12, so that the molten metal may fill up the cavities within the casting-cavity inserts 11 and 12, wherein the molten metal may be aluminum, copper, iron, steel or other metal; cooling the casting-cavity inserts 11 and 12 by using a cooling liquid, so that the molten metal within the casting-cavity inserts 11 and 12 may solidify; and taking the cooled and solidified metal from the casting-cavity inserts 11 and 12 to form a hose coupling 1, as shown in FIG. 1B. By using the method described above, a hose coupling according to the present invention may be obtained.

Figure 2A:
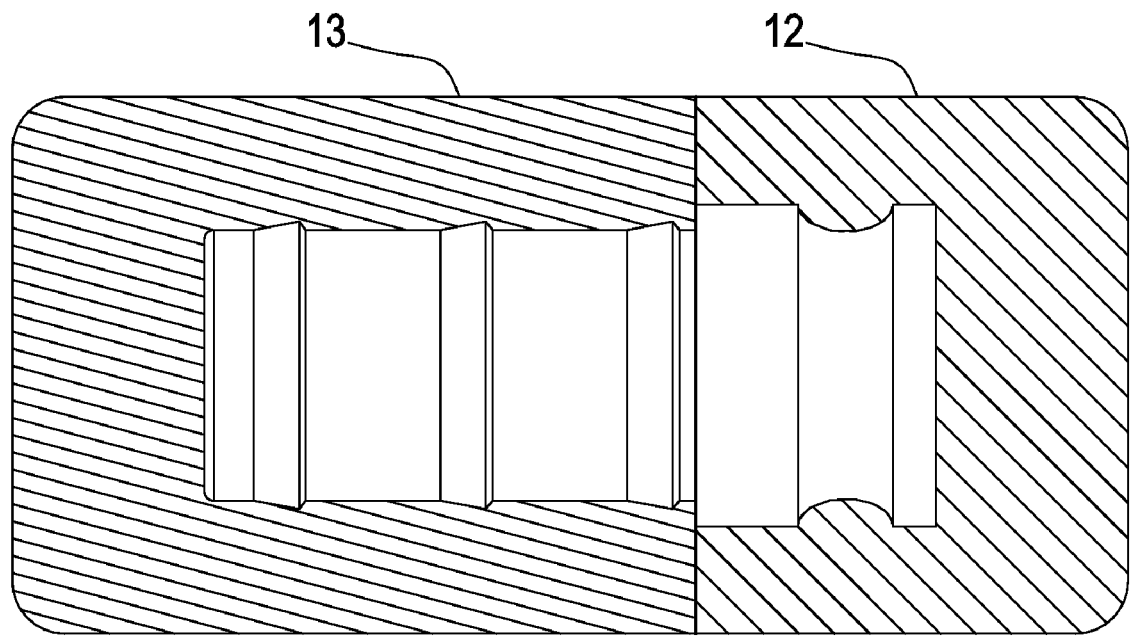
FIGS. 2A and 2B are, respectively, schematic diagrams for the flow of manufacture and the product in another embodiment of the present invention.
Figure 2B:
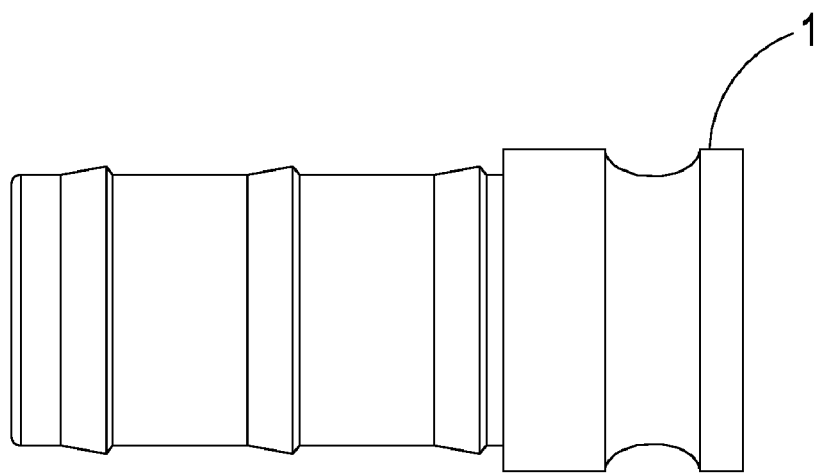
Figure 3:
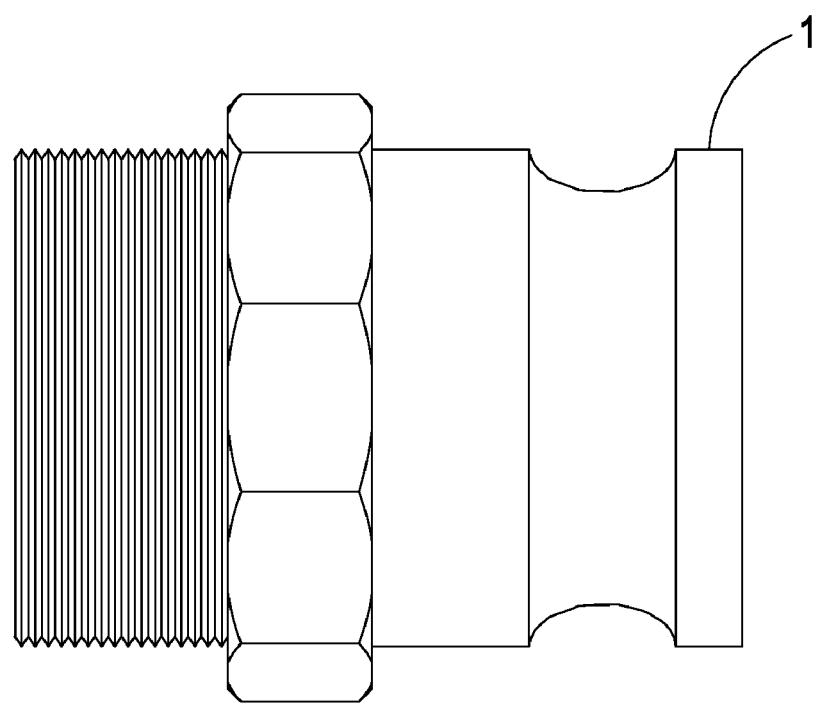
FIG. 3-8 are schematic diagrams for other products according to the method for manufacturing hose couplings according to the present invention.
Figure 4:
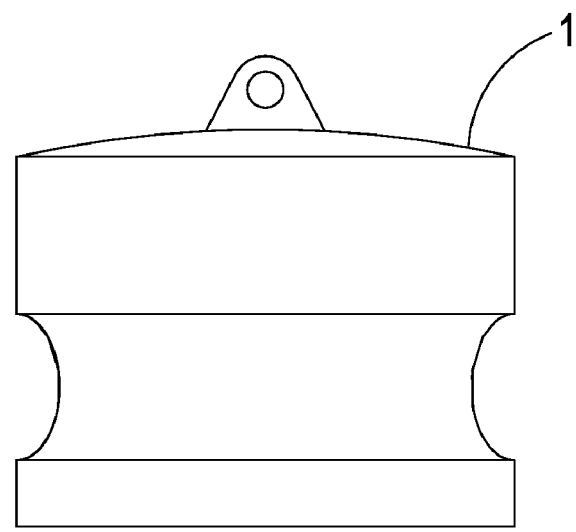
Figure 5:
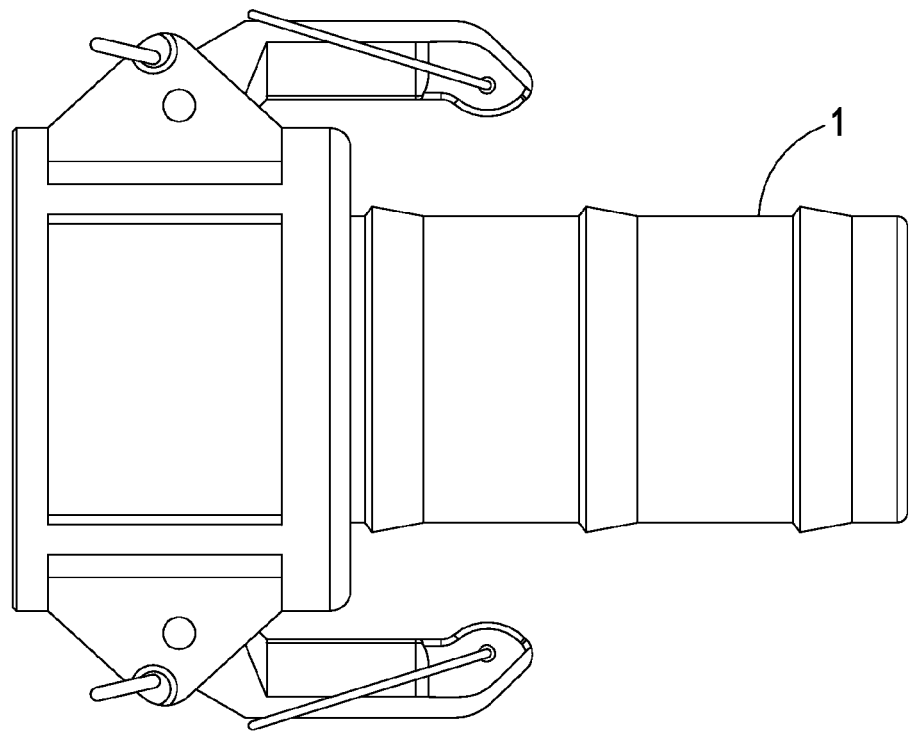
Figure 6:
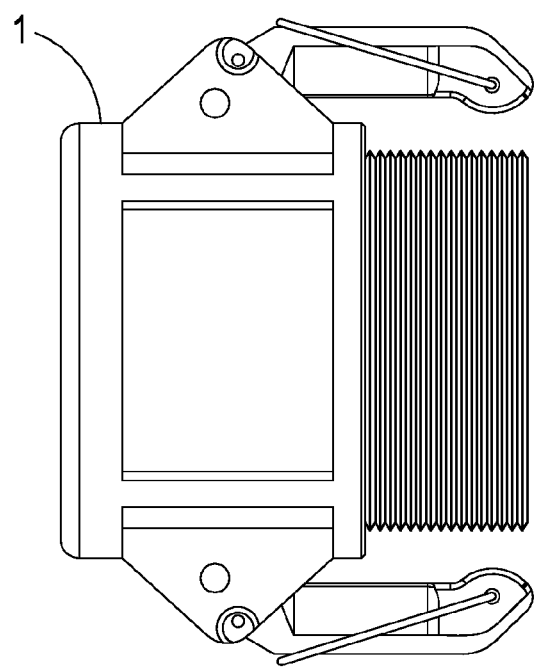
Figure 7:
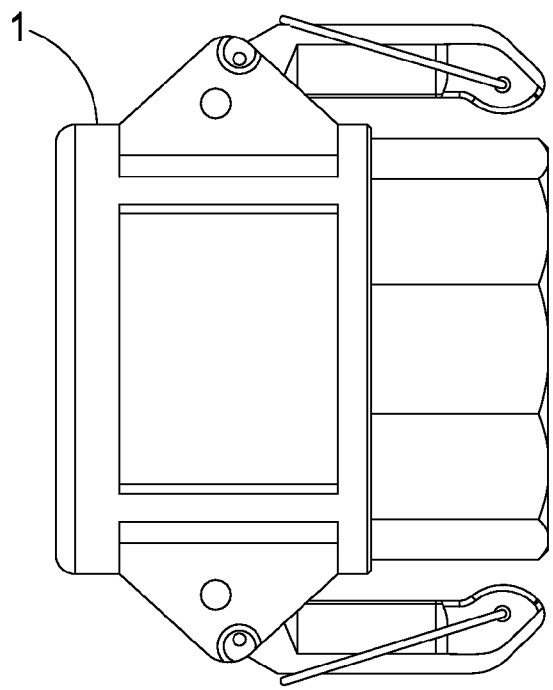
Figure 8:
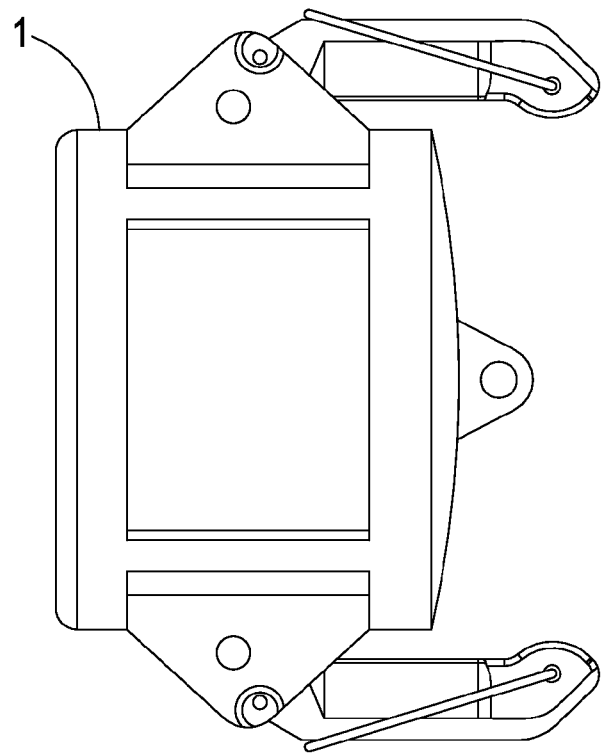

Referring to FIGS. 2A and 2B, which are, respectively, schematic diagrams for the flow of manufacture and the product in another embodiment of the method for manufacturing hose couplings according to the present invention. Another top casting-cavity insert 13 is used to adapt to the original bottom casting-cavity insert 12 as shown in FIG. 2A and for manufacturing another type of hose coupling as shown in FIG. 2B. Alternatively, the original top casting-cavity insert 11 may be used to adapt to another bottom casting-cavity insert, for manufacturing another type of hose coupling. The flow of manufacture with respect to FIGS. 2A and 2B is omitted herein since it is equivalent to that described above with respect to FIGS. 1A and 1B.

Therefore, by utilizing the characteristic capability of adapting a top casting-cavity insert and a bottom casting-cavity insert as desired, various types of hose couplings may be obtained as desired as shown in FIG. 3 to FIG. 8.

In comparison with conventional techniques, the method for manufacturing hose couplings provided by the present invention has the following advantages:

1. The invention provides a method for manufacturing hose couplings that can manufacture various types of hose couplings by adapting and replacing a top casting-cavity insert and a bottom casting-cavity insert as desired.

2. The invention provides a method for manufacturing hose couplings by utilizing a characteristic capability of adapting two casting-cavity inserts as desired to decrease the number of molds for use, so as to reduce the space occupied by the molds. Thus, the method is superior to that for manufacturing conventional couplings, in which different molds are needed for different types of couplings and, thus, more space can be used for storing different types of molds.

3. The invention provides a method for manufacturing hose couplings that may decrease the costs for making molds by decreasing the number of molds.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for manufacturing hose couplings, the method comprising steps:
   making a plurality of types of top casting-cavity inserts and a plurality of types of bottom casting-cavity inserts, each of the inserts being structured to be interchangeable with one another, as desired, within a mold base of a casting machine;
   jointing and fixing one of the plurality of top casting-cavity inserts and one of the plurality of bottom casting-cavity inserts within the mold base;
   injecting a high-temperature molten metal from a furnace into both the casting-cavity inserts, so that the molten metal can fill up the casting-cavity inserts; and
   releasing the solidified metal from the casting-cavity inserts to produce the desired hose coupling,
   wherein the one of the plurality of top casting-cavity inserts defines a cavity having a first shape and the one of the plurality of bottom casting-cavity inserts defines a cavity having a second shape, the second shape being different than the first shape.

2. The method according to claim 1, wherein the molten metal is injected through an automatic machine or manually into both the casting-cavity inserts.

3. The method according to claim 1, wherein the molten metal is aluminum.

4. The method according to claim 1, wherein the molten metal is copper.

5. The method according to claim 1, wherein the molten metal is iron.

6. The method according to claim 1, wherein the molten metal is steel.

7. A method for manufacturing hose couplings, the method comprising steps:
   making a plurality of types of top casting-cavity inserts and a plurality of types of bottom casting-cavity inserts, each of the inserts being structured to be interchangeable with one another, as desired, within a mold base of a casting machine;
   jointing and fixing one of the plurality of casting-cavity inserts and one of the plurality of bottom casting-cavity inserts within the mold base;
   injecting a high-temperature molten metal from a furnace into both the casting-cavity inserts, so that the molten metal can fill up the casting-cavity inserts;
   cooling both the casting-cavity inserts by using a cooling liquid, so that the molten metal within both the casting-cavity inserts can be cooled and solidified; and
   releasing the solidified metal from the casting-cavity inserts to produce the desired hose coupling,
   wherein the one of the plurality of top casting-cavity inserts defines a cavity having a first shape and the one of the plurality of bottom casting-cavity inserts defines a cavity having a second shape, the second shape being different than the first shape.

8. The method according to claim 7, wherein the molten metal is injected through an automatic machine or manually into both the casting-cavity inserts.

9. The method according to claim 7, wherein the molten metal is aluminum.

10. The method according to claim 7, wherein the molten metal is copper.

11. The method according to claim 7, wherein the molten metal is iron.

12. The method according to claim 7, wherein the molten metal is steel.

* * * * *